United States Patent [19]

Kawamura et al.

[11] Patent Number: 4,753,200
[45] Date of Patent: Jun. 28, 1988

[54] ENGINE COMBUSTION CONTROL SYSTEM

[75] Inventors: Yoshihisa Kawamura; Yasuo Nakajima, both of Yokosuka, Japan

[73] Assignee: Nissan Motor Company, Limited, Kanagawa, Japan

[21] Appl. No.: 807,479

[22] Filed: Dec. 10, 1985

[30] Foreign Application Priority Data

Jan. 29, 1985 [JP] Japan .................................. 60-16263
Mar. 4, 1985 [JP] Japan .................................. 60-43283

[51] Int. Cl.⁴ .......................................... F02M 35/10
[52] U.S. Cl. ................................ 123/188 M; 123/306
[58] Field of Search ................. 123/188 M, 425, 435, 123/306, 308, 440

[56] References Cited

U.S. PATENT DOCUMENTS

| 4,172,433 | 10/1979 | Bianchi et al. | 123/486 |
| 4,256,062 | 3/1981 | Schaefer | 123/188 M |
| 4,455,980 | 6/1984 | Sasayama et al. | 123/435 |
| 4,467,749 | 8/1984 | Maeda | 123/188 M |
| 4,480,606 | 11/1984 | Kato et al. | 123/440 |
| 4,543,934 | 10/1985 | Morita et al. | 123/435 |
| 4,561,401 | 12/1985 | Hata et al. | 123/435 |
| 4,574,748 | 3/1986 | Inoue et al. | 123/188 M |
| 4,592,315 | 6/1986 | Kobayashi et al. | 123/188 M |
| 4,598,678 | 7/1986 | Kobayashi et al. | 123/188 M |

FOREIGN PATENT DOCUMENTS

| 2457436 | 6/1976 | Fed. Rep. of Germany . |
| 2855781 | 6/1979 | Fed. Rep. of Germany . |
| 2803533 | 8/1979 | Fed. Rep. of Germany . |
| 3044292 | 6/1982 | Fed. Rep. of Germany . |
| 3147198 | 8/1982 | Fed. Rep. of Germany . |
| 3148457 | 7/1983 | Fed. Rep. of Germany . |
| 3344077 | 6/1984 | Fed. Rep. of Germany . |
| 58-28529 | 2/1983 | Japan . |
| 2087975 | 6/1982 | United Kingdom . |

Primary Examiner—Willis R. Wolfe, Jr.
Assistant Examiner—M. Macy
Attorney, Agent, or Firm—Foley & Lardner, Schwartz, Jeffery, Schwaab, Mack, Blumenthal & Evans

[57] ABSTRACT

An arrangement serves to swirl air flow into an engine to an adjustable degree. The degree of swirl in the air flow affects the duration of combustion of a mixture of air and fuel in the engine. The degree of swirl is adjusted so as to hold the duration of mixture combustion within an acceptable range, the acceptable range varying in accordance with engine operating conditions.

8 Claims, 10 Drawing Sheets

ENGINE COMBUSTION CONTROL SYSTEM

BACKGROUND OF THE INVENTION

1. Field of the Invention

This invention relates to combustion control system for an engine, such as an internal combustion engine.

2. Description of the Prior Art

In internal combustion engines, when engine speed is low and engine load is small, swirls in intake air flow enhance combustion characteristics. At high engine speeds and great engine loads, high rates of intake air flow are necessary to achieve adequate engine power output.

Japanese Patent Publication No. 58-28529 discloses an air flow path control system for an internal combustion engine. This system has two air intake ports for each engine cylinder. The first port is designed to impart a swirl to the air flow. The second port allows a high air flow rate. At low engine speeds and small engine loads, a valve blocks the second port so that swirls are effectively developed in the air flow. At high engine speeds and great engine loads, the valve unblocks the second port so that air flows into the engine cylinder at a high rate substantially without swirling.

SUMMARY OF THE INVENTION

It is an object of this invention to provide an engine combustion control system which enables excellent engine performance under all operating conditions.

In accordance with this invention, an arrangement serves to swirl air flow into an engine to an adjustable degree. The degree of swirl in the air flow affects the duration of combustion of the mixture of air and fuel in the engine. The degree of swirl is adjusted to keep the duration of mixture combustion within an acceptable range.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
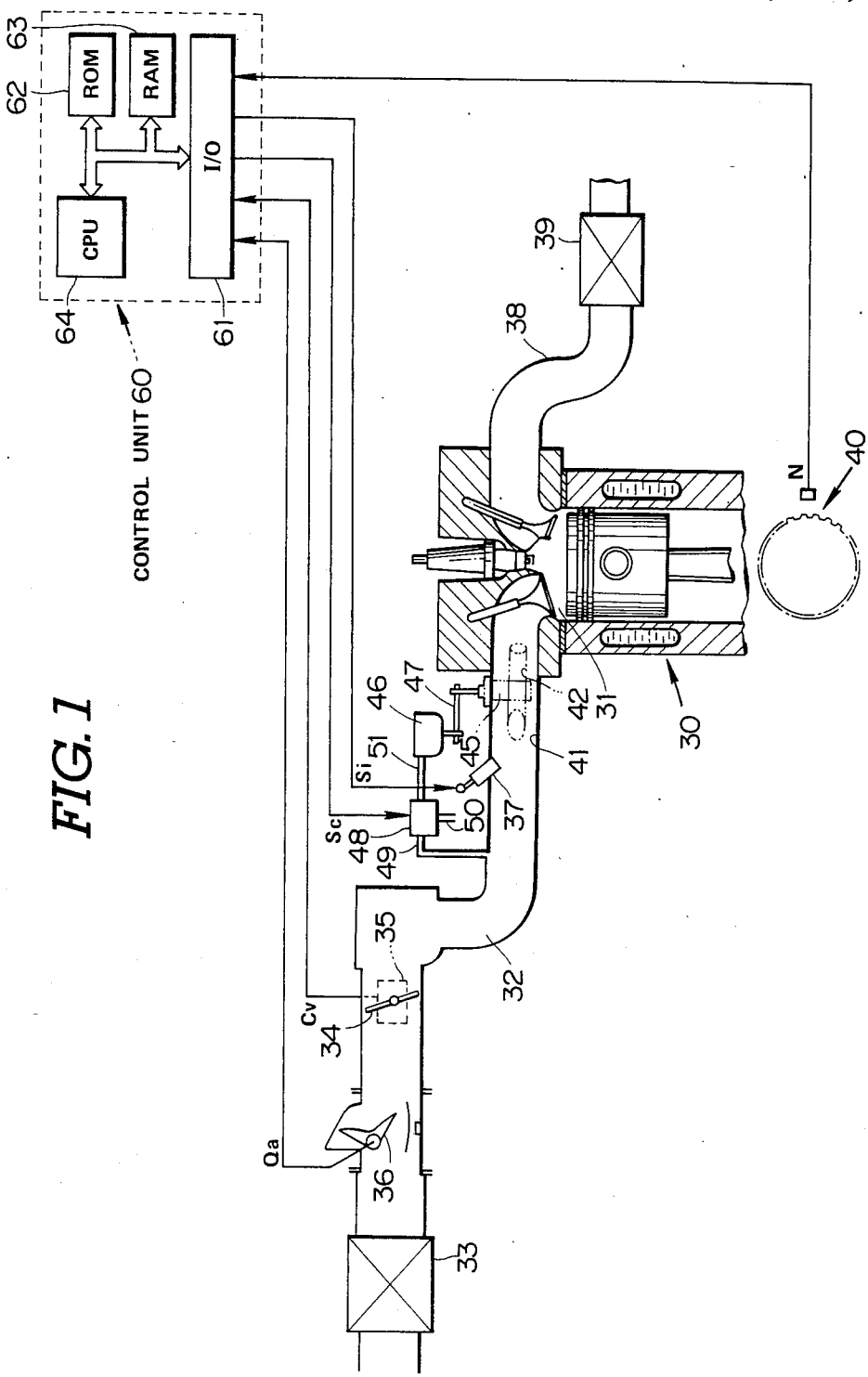
FIG. 1 is a diagram of an engine combustion control system according to a first embodiment of this invention.

With reference to FIG. 1, an engine 30 has combustion chambers or cylinders 31, only one of which is shown. An air intake passage 32 extending between atmosphere and each combustion chamber 31 conducts air from atmosphere to each combustion chamber 31. The downstream segment of the air passage 32 defined by an intake manifold and an engine cylinder head has branches leading to the respective combustion chambers 31 via inlet valves (no reference numeral). An air cleaner 33 is disposed in the upstream segment of the air intake passage 32. A rotatable throttle valve 34 linked to an accelerator pedal (not shown) and disposed in the air intake passage 32 downstream of the air cleaner 33 adjustably determines the rate of air flow into the combustion chambers 31. A position sensor 35 connected to the throttle valve 34 generates a signal Cv representing the angular position of the throttle valve 34. An air flow meter 36 disposed in the air intake passage 32 between the air cleaner 33 and the throttle valve 34 generates a signal Qa representing the rate of air intake flow. A fuel injector or injectors 37 controlled via a signal Si serve to inject fuel into the air intake passage 32 downstream of the throttle valve 34.

The fuel injection control signal Si includes pulses synchronous with rotation of the engine crankshaft. Each fuel injection pulse Si applied to the fuel injector or injectors 37 causes the injector or injectors 37 to remain open and enable fuel injection. The rate of fuel injection is adjusted by controlling the width of the fuel injection pulses Si.

An exhaust passage 38 extends between each combustion chamber 31 and atmosphere. Exhaust gases emitted from the combustion chambers 31 travel to atmosphere via the exhaust passage 38. The upstream segment of the exhaust passage 38 defined by the engine cylinder head and an exhaust manifold has branches leading from the respective combustion chambers 31 via outlet valves (no reference numeral). A catalytic converter 39 disposed in the exhaust passage 38 downstream of the exhaust manifold treats exhaust gases. The catalytic converter 39 may be of the three-way type, converting carbon monoxide CO, hydrocarbon HC, and nitrogen oxides NOx into essentially harmless substances.

A rotational speed sensor 40 associated with an engine crankshaft generates a signal N representing the rotation speed of the crankshaft.

Figure 2:
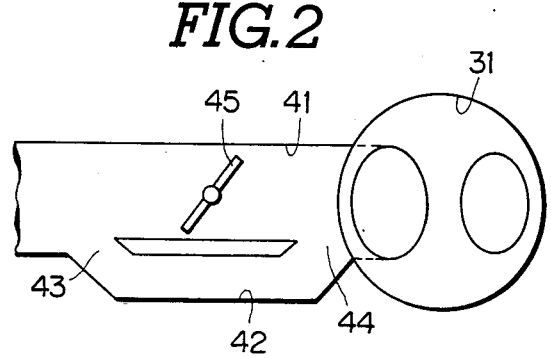
FIG. 2 is a diagram of the air intake port in the system of FIG. 1.

The downstream segment of the air intake passage 32 has air intake ports leading to the respective combustion chambers 31. As shown in FIGS. 1 and 2, each air intake port forks into a first passage 41 and a second passage 42 at a point 43. The two passages 41 and 42 meet again at a point 44 downstream of the first point 43, leading to the combustion chamber 31 via a common segment.

The first passage 41 is essentially straight and applies negligible resistance to air flow, so that the passage 41 slows a high rate of air flow into the combustion chamber 31 substantially without inducing swirls in the air flow and also without resisting the air flow. As will be described hereinafter, the first passage 41 can be selectively blocked and unblocked. At high engine loads, the first passage 41 is unblocked. At low engine loads, the first passage 41 is blocked. The first passage 41 will be referred to as a high power port hereinafter.

The second passage 42 is helical in order to induce swirls in the air flow into the combustion chamber 31. The second passage 42 will be referred to as a swirl port hereinafter. It should be noted that the high power port 41 exerts significantly less resistance to air flow than the swirl port 42.

A swirl control valve 45 selectively blocks and unblocks the high power port 41. When the valve 45 blocks the high power port 41, intake air passes only through the swirl port 42 so that swirls are induced in the air flow into the combustion chamber 31. When the valve 45 unblocks the high power port 41, a high rate of air flow into the combustion chamber 31 is allowed with negligible resistance and substantially without swirls. In this case, a high percentage of intake air passes through the high power port 41, since resistance to the air flow offered by the high power port 41 is significantly smaller than the resistance to the air flow offered by the swirl port 42.

It should be noted that one swirl control valve 45 is provided for each of the branched intake ports and therefor the number of these valves 45 is generally equal to the number of the combustion chambers 31.

A pressure responsive actuator 46 including a diaphragm is connected to the swirl control valves 45 via a link 47 to drive the valves 45. A three-way solenoid valve 48 controllable via a signal Sc has first and second inlets 49 and 50, and an outlet 51 connectable to either of the two inlets. The first valve inlet 49 is connected to a point of the air intake passage 32 downstream of the throttle valve 34 so that it is exposed to a vacuum developed in the passage 32 downstream of the throttle valve 34, that is, an intake manifold vacuum. The second valve inlet 50 opens into atmosphere. The valve outlet 51 is connected to a working chamber of the actuator 46 partially defined by the diaphragm. When the solenoid valve 48 is energized by the control signal Sc, the first valve inlet 49 and the valve outlet 51 are connected so that the intake manifold vacuum is applied to the working chamber of the actuator 46, driving the swirl control valves 45 into a position in which the high power ports 41 are blocked. When the solenoid valve 48 is de-energized by the control signal Sc, the second valve inlet 50 and the valve outlet 51 are connected so that atmospheric pressure is applied to the working chamber of the actuator 46, driving the swirl control valves 45 into a position in which the high power ports 41 are unblocked.

A control unit 60 includes a combination of an input-/output (I/O) circuit 61, a read-only memory (ROM) 62, a random-access memory (RAM) 63, and a central processing unit (CPU) 64. The I/O circuit 61 is electrically connected to the sensors 35, 36, and 40 to receive the throttle position signal Cv, the air flow rate signal Qa, and the engine speed signal N. The I/O circuit 61 generates the fuel injection signal Si and the valve control signal Sc which are applied to the fuel injector or injectors 37 and the solenoid valve 48 via electrical connections between the circuit 61 and the elements 37 and 48.

Figure 3:
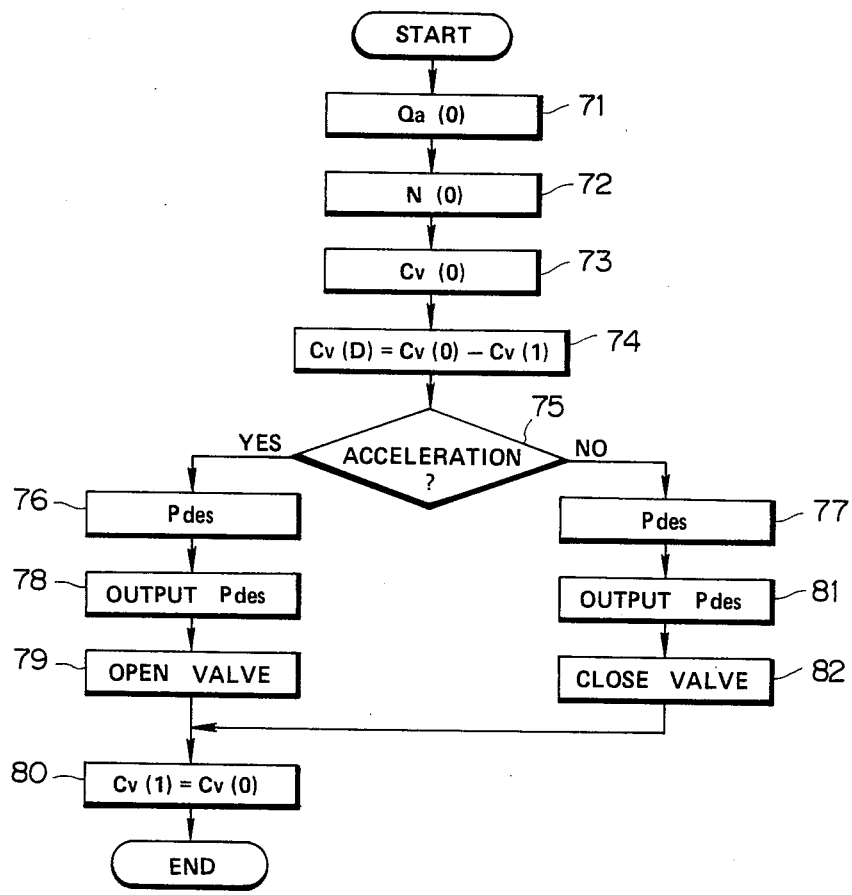
FIG. 3 is a flowchart of a program for operating the control unit of FIG. 1.

The control unit 60 operates in accordance with a program stored in the ROM 62. The program reiterates periodically at a fixed frequency. FIG. 3 is a flowchart of the program.

As shown in FIG. 3, in a first step 71, the current air flow rate is derived from the signal Qa. In the program, the variable Qa(O) represents this current air flow rate.

In a step 72 following the step 71, the current engine speed is derived from the signal N. In the program, the variable N(O) represents this current engine speed.

In a step 73 following the step 72, the current position of the throttle valve 34 is derived from the signal Cv. In the program, the variable Cv(O) represents this current throttle position.

In a step 74 following the step 73, the difference between the current throttle position Cv(O) and the immediately prior throttle position Cv(1) is calculated. In the program, the variable Cv(D) represents this difference, that is, the change in the throttle position over a fixed interval. It should be noted that, as will be made clear hereinafter, the variable Cv(1) represents the position of the throttle valve 34 derived in the execution cycle of the program which immediately precedes the present execution cycle of the program.

In a step 75 following the step 74, the control unit 60 determines whether or not the engine is required to accelerate on the basis of the throttle positional variation Cv(D). If the engine is required to accelerate, the program advances to a step 76. If the engine is exposed to other conditions, e.g., if the engine is required to cruise, the program advances to a step 77.

In the step 76, a desired duration Pdes of fuel injection pulse is derived from the current air flow rate Qa(O) and the current engine speed N(O) by referring to the following equation:

$$Pdes = K1Qa(O)/N(O)$$

where K1 is a preset constant designed so as to maintain the air-to-fuel ratio of the mixture at the stoichiometric value, that is, 14.7. It should be noted that the constant K1 may be given some other value which would cause air-fuel mixtures richer than a stoichiometric mixture.

In a step 78 following the step 76, the actual duration of the fuel injection pulse Si is adjusted to the desired value Pdes given in the preceding step 76. Accordingly, when the engine is required to accelerate, the air-to-fuel ratio of the mixture is held at the stoichiometric value. The supply of the stoichiometric air-fuel mixture enables the engine 30 to develop adequate power output.

In-a step 79 following the step 78, the valve control signal Sc is adjusted to energize the three-way valve 48 so that the swirl control valves 45 unblock the high power air intake ports 41. Accordingly, when the engine is required to accelerate, the high power air intake ports 41 are unblocked.

After the step 79, the program advances to a final step 80 in which the variable Cv(1) is set to the value Cv(O). This step 80 enables the variable Cv(1) to represent the position of the throttle valve 34 at a moment immediately prior to the derivation of the current throttle position in the step 73.

In the step 77, a desired duration Pdes of fuel injection pulse is derived from the current air flow rate Qa(O) and the current engine speed N(O) by referring to the following equation:

$$Pdes = K2 Qa(O)/N(O)$$

where K2 is a preset constant designed so as to keep the air-fuel mixture leaner than the stoichiometric air-fuel mixture. For example, the air-to-fuel ratio of this lean mixture may be 22.0.

In a step 81 following the step 77, the actual duration of the fuel injection pulse Si is adjusted to the desired value Pdes given in the preceding step 77. Accordingly, when the engine is exposed to conditions other than acceleration, e.g., when the engine is required to cruise, the air-fuel mixture is kept leaner than the stoichiometric air-fuel mixture. supplying the lean air-fuel mixture to the engine 30 effectively reduces combustion noise and NOx emissions from the engine 30.

In a step 82 following the step 81, the valve control signal Sc is adjusted to de-energize the three-way valve 48 so that the swirl control valves 45 block the high power air intake ports 41. Accordingly, when the engine is exposed to conditions other than acceleration, e.g., when the engine is required to cruise, the high power air intake ports 41 are blocked.

After the step 82, the program advances to the final step 80 mentioned previously.

Figure 4:
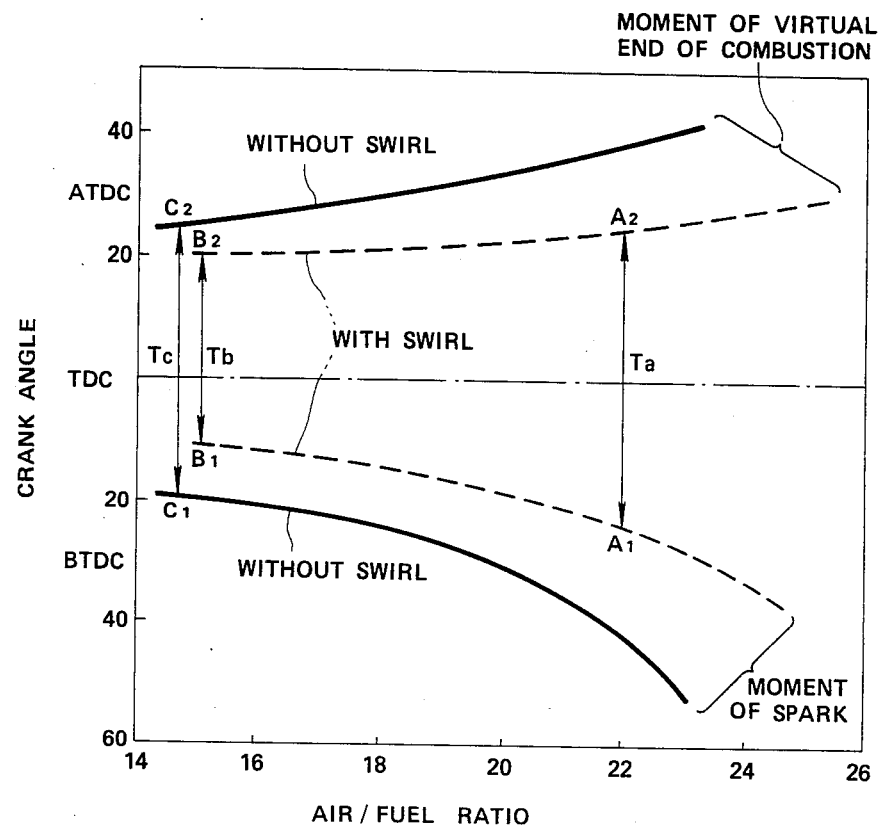
FIG. 4 is a graph of the relationship between the air-to-fuel ratio and the spark timing, and of the relationship between the air-to-fuel ratio and the timing of the virtual end of mixture combustion.

In FIG. 4, the lower broken line represents the relationship between the air-to-fuel ratio of the mixture and the spark timing when the swirl control valves 45 block the high power ports 41 so as to swirl the mixture into the combustion chambers 31. The upper broken line represents the relationship between the air-to-fuel ratio of the mixture and the crank angle position at which 90 percent of the mixture has burned.

The lower solid line represents the relationship between the air-to-fuel ratio of the mixture and the spark timing when the swirl control valves 45 unblock the high power ports 41 to allow a high rate of mixture flow into the combustion chambers 31 substantially without swirling the mixture flow. The upper solid line represents the relationship between the air-to-fuel ratio of the mixture and the crank angle position at which 90 percent of the mixture has burned.

In operation, when the engine 30 is cruising, a lean air-fuel mixture is supplied to the engine 30 and the swirl control valves 45 block the high power air intake ports 41 as described previously. In the case where the air-to-fuel ratio of the lean mixture is 22.0, the combustion duration is represented by the interval Ta between the points A1 and A2 on the broken lines in FIG. 4. As is understood from FIG. 4, swirls in the mixture flow reduce the combustion duration, that is, increase the combustion speed. Thus, the swirls facilitate combustion of the mixture.

When the engine accelerates, the air-fuel mixture is enriched to the stoichiometric level and the swirl control valves 45 unblock the high power ports 41 to allow a high rate of mixture flow into the combustion chambers 31 substantially without swirl. The combustion duration of the stoichiometric mixture is represented by the interval Tc between the points C1 and C2 on the solid lines in FIG. 4. It should be noted that the air-to-fuel ratio of the stoichiometric mixture is 14.7. If the high power ports 41 are blocked to cause the mixture flow to swirl during engine acceleration, the combustion duration would be represented by the interval Tb between the points B1 and B2 on the broken lines in FIG. 4. The actual combustion duration Tc is considerably longer than the assumed combustion duration Tb.

Figure 5:
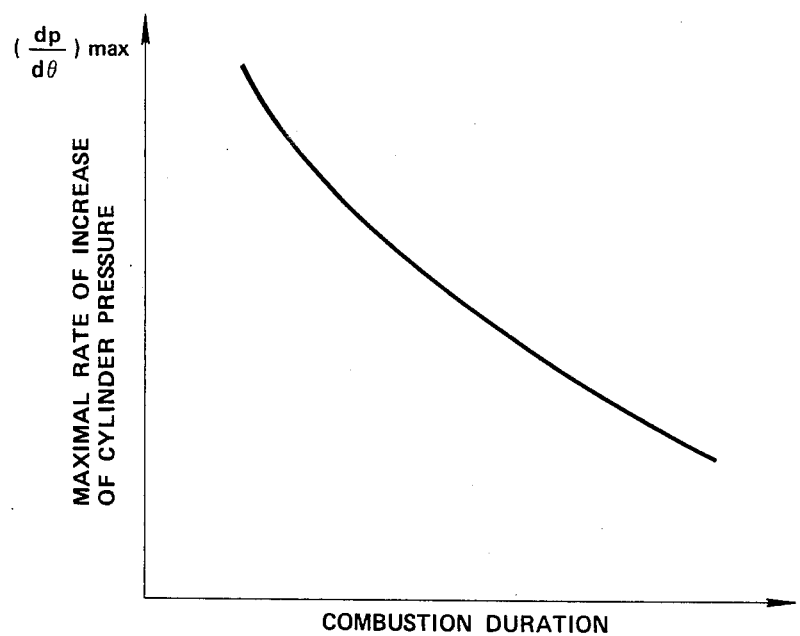
FIG. 5 is a graph of the relationship between the combustion duration and the maximal rate of increase of pressure in the combustion chamber.

As shown in FIG. 5, the maximal increase rate of pressure in the combustion chambers labelled $dp/d\theta$ is inversely proportional to the combustion duration. Since the intensity of combustion noises emitted by the engine increase proportionally with the maximal increase rate of pressure $dp/d\theta$, the combustion noises become louder as the combustion duration decreases.

Figure 6:
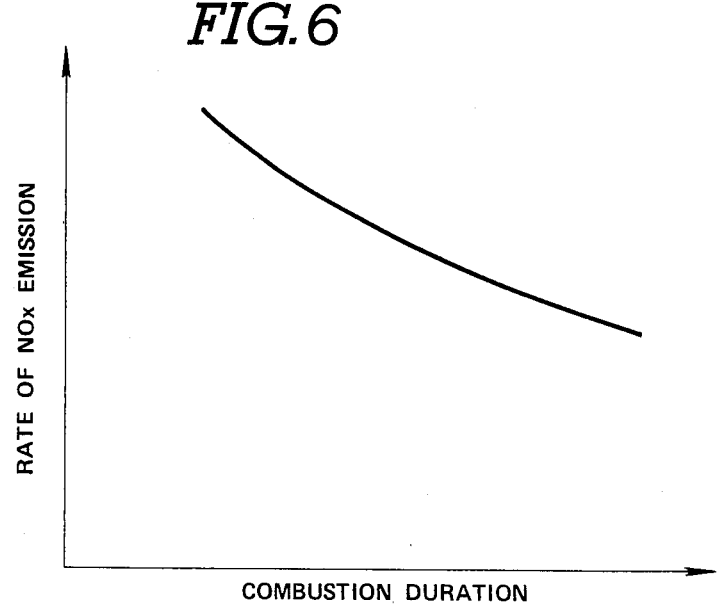
FIG. 6 is a graph of the relationship between the combustion duration and Nox emissions.

As shown in FIG. 6, the rate of NOx emissions is inversely proportional to the combustion duration.

It should be noted that as the combustion duration increases, the power output characteristics of the engine drop.

In the system of FIG. 1, when the engine is accelerating, there are essentially no swirls in the mixture flow so that the combustion duration remains within an acceptable range, in particular from the standpoint of combustion noise and NOx emissions, even though the stoichiometric air-fuel mixture is supplied to the engine 30 to achieve adequate engine power output.

When the engine is cruising, swirls are developed in the mixture flow so that the mixture burns reliably within an acceptable duration, even though a lean air-fuel mixture is supplied to the engine 30 to effectively reduce combustion noise and NOx emissions.

It should be noted that the fuel injection pulses may be controlled on the basis of the combination of the intake manifold vacuum and the engine speed in place of the combination of the air flow rate and the engine speed. The fuel injection pulses may also be adjusted in accordance with other parameters, such as the monitored air-to-fuel ratio of the mixture represented by the output from an exhaust oxygen sensor, and the rate of exhaust gas recirculation.

in addition, acceleration of the engine may be detected on the basis of variations in the intake manifold vacuum.

Furthermore, the combustion duration may be adjusted in ways other than the control of swirls in the mixture air flow. For example, two spark plugs may be disposed in each combustion chamber, and one of the plugs may be disabled when the combustion duration is to be increased.

DESCRIPTION OF THE SECOND PREFERRED EMBODIMENT

Figure 7:
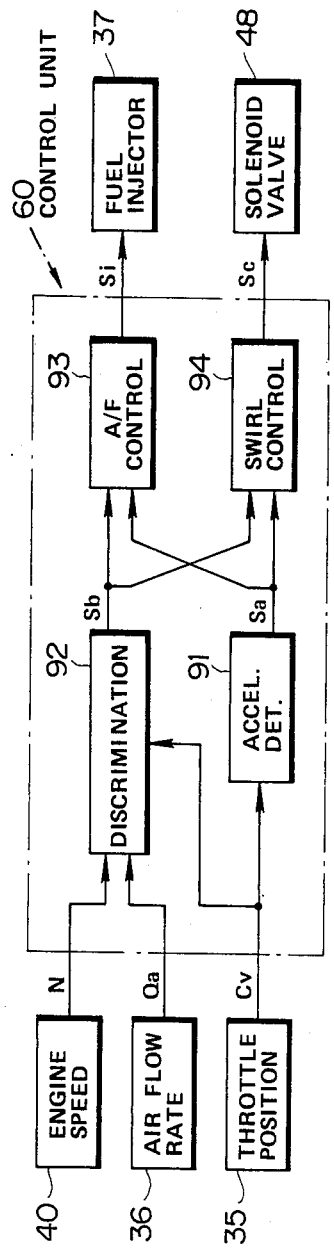
FIG. 7 is a block diagram of part of an engine combustion control system according to a second embodiment of this invention.

FIG. 7 shows part of a second embodiment of this invention which is similar to the embodiment of FIGS. 1-3 except for the internal structure of the control unit 60.

As shown in FIG. 7, the control unit 60 is basically composed of wired logic circuits including an acceleration detector 91, a discrimination circuit 92, an air-to-fuel ratio controller 93, and a swirl controller 94.

The acceleration detector 91 determines whether or not the engine is accelerating on the basis of the throttle position signal Cv from the sensor 35. When the engine is accelerating, this detector 91 generates a signal Sa representing the rate of acceleration.

The discrimination circuit 92 determines operating conditions of the engine 30 (see FIG. 1) on the basis of the air flow rate signal Qa and the engine speed signal N from the sensors 36 and 40. This circuit 92 generates a signal Sb representing a target air-to-fuel ratio of a mixture which varies as a function of the engine operating conditions.

The air-to-fuel ratio controller 93 generates a fuel injection signal Si on the basis of the signals Sa and Sb from the circuits 91 and 92. The fuel injection signal Si is outputted to the fuel injector or injectors 37. When the engine 30 is exposed to conditions other than acceleration, this controller 93 derives a rate of fuel injection from the signal Sb. This fuel injection rate is chosen to realize the target air-to-fuel ratio of the mixture determined by the discrimination circuit 92. When the engine 30 is accelerating, the controller 93 derives a rate of fuel injection from the signals Sa and Sb. This fuel injection rate is chosen to correct the target air-to-fuel ratio in accordance with the degree of acceleration.

The swirl controller 94 generates a swirl control signal Sc in accordance with the signals Sa and Sb from the circuits 91 and 92. The swirl control signal Sc is applied to the three-way valve 48. When the engine 30 is accelerating, the controller 94 adjusts the signal Sc to allow a high rate of intake air flow substantially without swirl. When the engine 30 is exposed to other conditions, the controller 94 adjusts the signal Sc to effectively swirl the intake air flow.

DESCRIPTION OF THE THIRD PREFERRED EMBODIMENT

Figure 8:
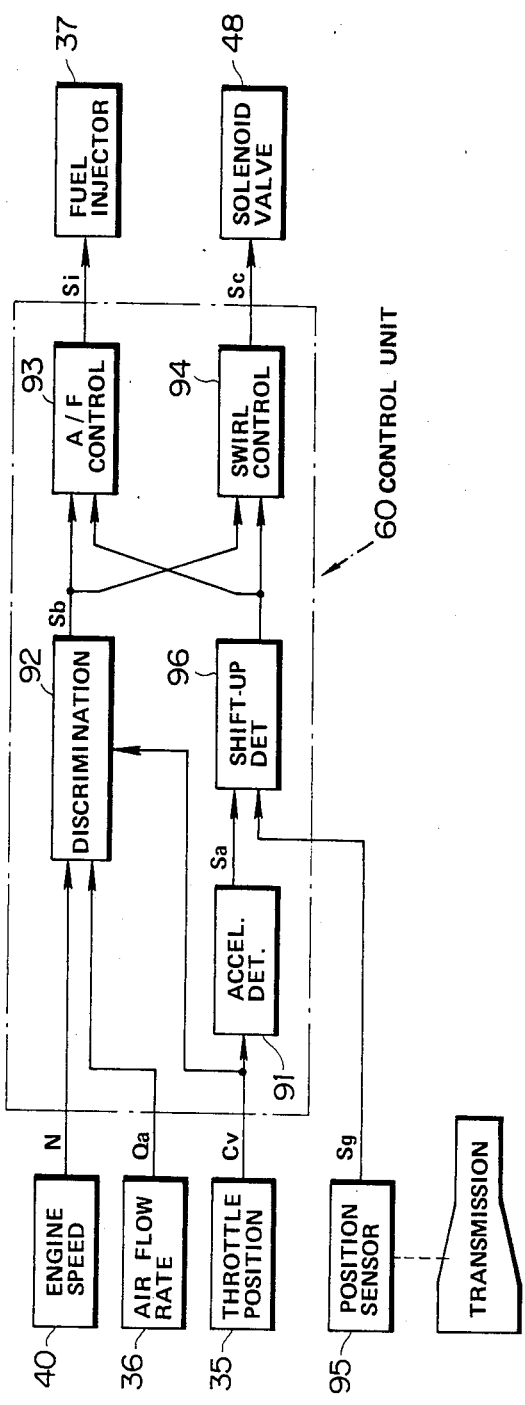
FIG. 8 is a block diagram of part of an engine combustion control system according to a third embodiment of this invention.

FIG. 8 shows part of a third embodiment of this invention which is similar to the embodiment of FIG. 7 except for the design changes described below.

The engine crankshaft is connected to a manual transmission. A gear position sensor 95 associated with the transmission generates a signal Sg representing the gear position of the transmission.

The control unit 60 includes a gear shift-up detector 96 which receives the signals Sa and Sg from the elements 91 and 95. When transmission is shifted to a higher gear position, this detector 96 generates a signal which orders the controller 93 to enrich the air-fuel mixture. When the throttle valve 34 (see FIG. 1) is opened wider, the detector 96 generates a signal which enables the controller 94 to interrupt the generation of swirls in the intake air flow and also to allow a high rate of intake air flow.

During normal acceleration, the air-fuel mixture is first enriched in response to the transmission gear shift-up and then the generation of swirls in the intake air flow is interrupted in response to movement of the throttle valve 34. Accordingly, the combustion speed remains high at the start of acceleration and is prevented from increasing excessively during the rest stage of acceleration. This operation enables exceedingly quick engine response and keeps the intensity of combustion noise and the rate of NOx emission to within acceptable ranges when the engine is accelerating.

DESCRIPTION OF THE FOURTH PREFERRED EMBODIMENT

Figure 9:
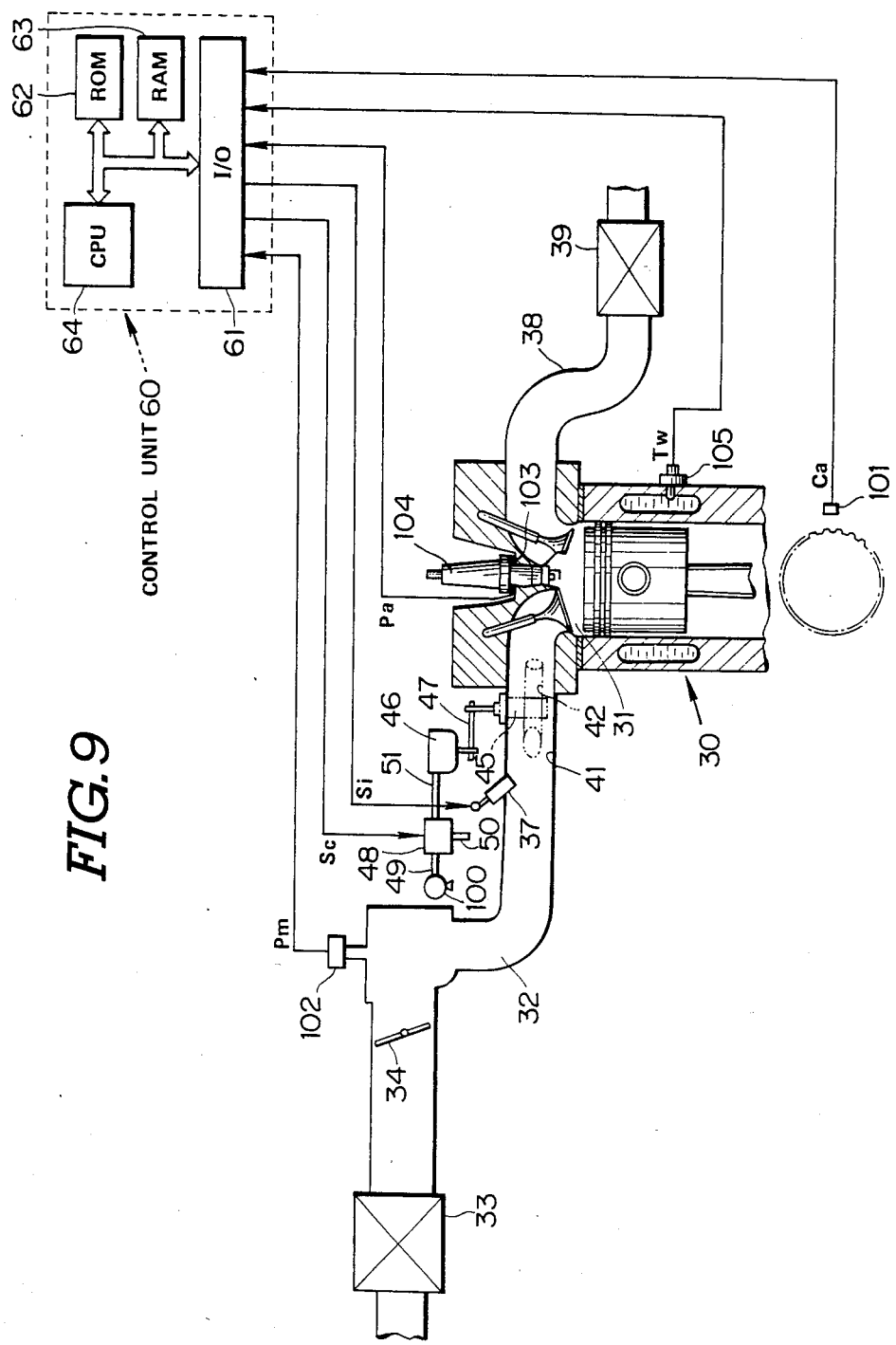
FIG. 9 is a diagram of an engine combustion control system according to a fourth embodiment of this invention.

With reference to FIG. 9, an engine 30 has combustion chambers or cylinders 31, only one of which is shown. An air intake passage 32 extending between atmosphere and each combustion chamber 31 conducts air from atmosphere to each combustion chamber 31. The downstream segment of the air passage 32 defined by an intake manifold and an engine cylinder head has branches leading to the respective combustion chambers 31 via inlet valves (no reference numeral). An air cleaner 33 is disposed in the upstream segment of the air intake passage 32. A rotatable throttle valve 34 linked to an accelerator pedal (not shown) and disposed in the air intake passage 32 downstream of the air cleaner 33 adjustably determines the rate of air flow into the combustion chambers 31. A fuel injector or injectors 37 controllable via a signal Si serve to inject fuel into the air intake passage 32 downstream of the throttle valve 34.

The fuel injection control signal Si includes pulses synchronous with rotation of the engine crankshaft. Each fuel injection pulse Si applied to the fuel injector or injectors 37 causes the injector or injectors 37 to remain open and enable fuel injection. The rate of fuel injection is adjusted via control of the duration of fuel injection pulses Si.

An exhaust passage 38 extends between each combustion chamber 31 and atmosphere as in the embodiment of FIGS. 1-3. A catalytic converter 39 is disposed in the exhaust passage 38 as in the embodiment of FIGS. 1-3.

The downstream segment of the air intake passage 32 has air intake ports leading to the respective combustion chambers 31. As in the embodiment of FIGS. 1-3, each air intake port includes a high power passage 41 and a swirl passage 42.

A swirl control valve 45 associated with the high power port 41 serves to continuously adjust the effective cross-sectional area of the high power port 41. When the valve 45 fully blocks the high power port 41, intake air toward the combustion chamber 31 passes through only the swirl port 42 so that swirls are most effectively induced in the air flow into the combustion chamber 31. As the valve 45 unblocks the high power port 41, a higher rate of intake air flow is allowed and swirls in the air flow are reduced. It should be noted that when the high power port 41 is fully unblocked, it applies significantly less resistance to air flow than the swirl port 42. When the valve 45 fully unblocks the high power port 41, the maximum rate of air flow into the combustion chamber 31 is allowed with the least possible resistance and substantially without swirls.

It should be noted that one swirl control valve 45 is provided for each of the branched intake ports and therefor the number of these valves 45 is generally equal to the number of the combustion chambers 31.

A pressure responsive actuator 46 including a diaphragm is connected to the swirl control valves 45 via a link 47 to drive the valves 45. As the pressure in a working chamber of the actuator 46 partially defined by the diaphragm increases, the swirl control valves 45 move from a fully closed position to a fully open position.

A three-way solenoid valve 48 controllable via a signal Sc has first and second inlets 49 and 50, and an outlet 51 connectable to either of the two inlets. The first valve inlet 49 is connected to a constant vacuum source 100, such as a vacuum pump. The second valve inlet 50 opens to atmosphere. The valve outlet 51 is connected to the working chamber of the actuator 46. When the solenoid valve 48 is de-energized by the control signal Sc, the first valve inlet 49 and the valve outlet 51 are connected so that the pressure in the working chamber of the actuator 46 drops toward a preset constant vacuum developed by the source 100. When the solenoid valve 48 is energized by the control signal Sc, the second valve inlet 50 and the valve outlet 51 are connected so that the pressure in the working chamber of the actuator 46 increases toward atmospheric pressure.

The valve control signal Sc includes pulses of a constant high frequency. Accordingly, the pressure in the working chamber of the actuator 46 remains at an essentially constant level which varies as a function of the duty cycle of the swirl control pulses Sc. Thus, the position of the swirl control valves 45 is adjusted via control of the duty cycle of the signal Sc. When the duty cycle of the signal Sc is 0%, the swirl control valves 45 are fully closed. As the duty cycle increases, the valves 45 are opened wider. When the duty cycle is 100%, the valves 45 are fully open.

A crank angle sensor 101 associated with the crankshaft of the engine 30 generates a signal Ca representing the angular position of the crankshaft, that is, the crank angle. The crank angle signal Ca also represents the rotational speed of the engine in a well-known way.

A pressure sensor 102 connected to the air intake passage 32 generates a signal Pm representing the pressure in the region of the air intake passage 32 downstream of the throttle valve 34, that is, the intake manifold vacuum.

A pressure sensor 103 in the shape of a washer is bolted to the cylinder head of the engine 30 together with a spark plug 104 for a specified one of the combustion chambers 31. The pressure sensor 103 generates a signal Pa representing the pressure in the combustion chamber 31, that is, the cylinder pressure. It should be noted that the pressure sensor 103 may be provided for each combustion chamber 31.

A temperature sensor 105 exposed to coolant within a water jacket of the engine 30 generates a signal Tw representing the temperature of engine coolant.

A control unit 60 includes the combination of an input/output (I/O) circuit 61, a read-only memory (ROM) 62, a random-access memory (RAM) 63, and a central processing unit (CPU) 64. The I/O circuit 61 is connected to the sensors 101, 102, 103, and 105 to receive the crank angle signal Ca, the intake manifold vacuum signal Pm, the cylinder pressure signal Pa, and the engine coolant temperature signal Tw. The I/O circuit 61 generates the fuel injection signal Si and the valve control signal Sc which are applied to the fuel injector or injectors 37 and the solenoid valve 48 via electrical connections between the circuit 61 and the elements 37 and 48.

Figure 10:
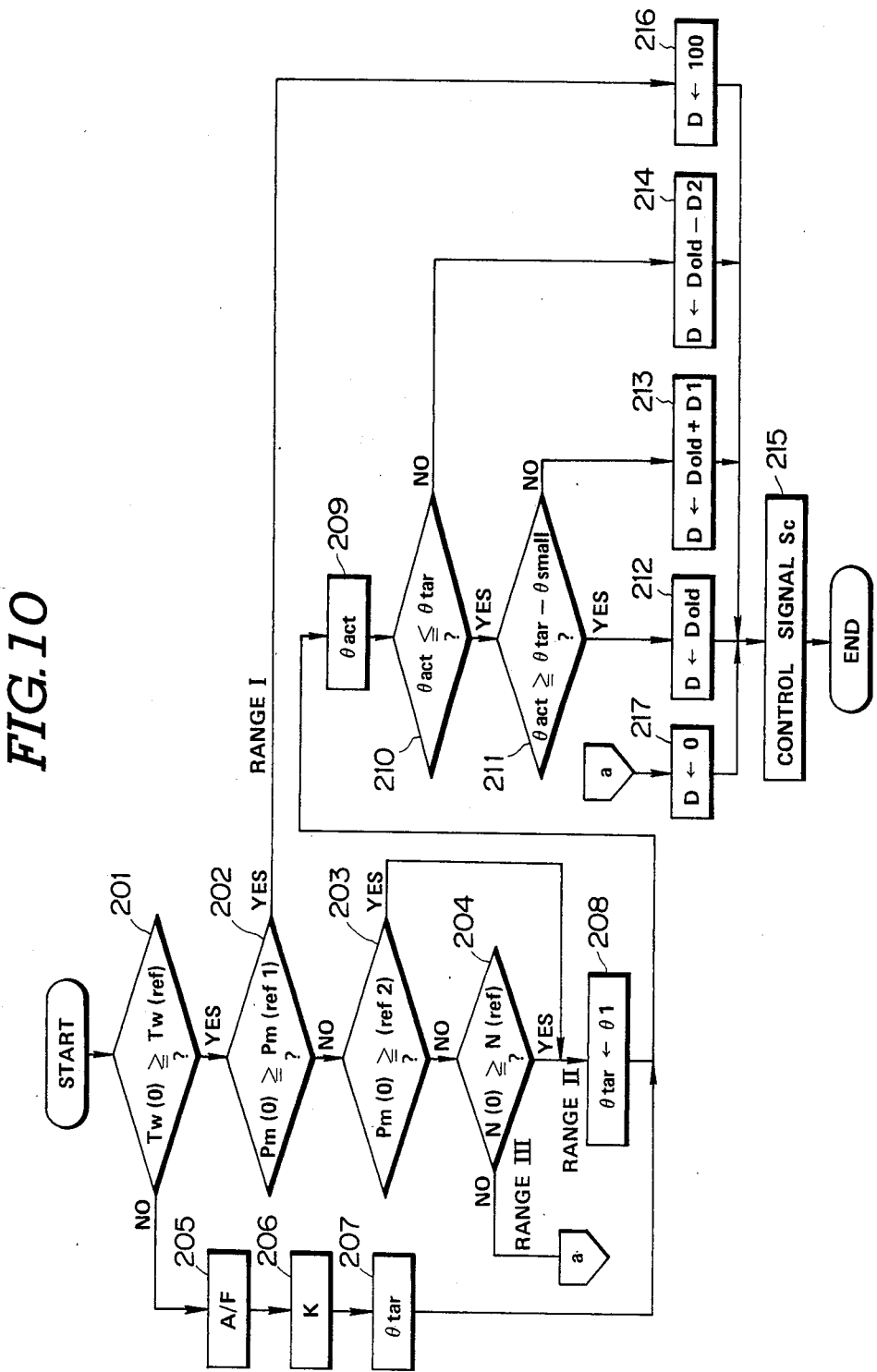
FIG. 10 is a flowchart of a combustion duration control segment of a program for operating the control unit of FIG. 9.

The control unit 60 operates in accordance with a program stored in the ROM 62. The program includes a swirl control segment which reiterates periodically at a fixed frequency. FIG. 10 is a flowchart of the swirl control segment of the program.

As shown in FIG. 10, in a first step 201, the current coolant temperature is derived from the signal Tw. In the program, the variable Tw(O) represents this current coolant temperature. Then, the coolant temperature Tw(O) is compared to a preset reference temperature Tw(ref). If the coolant temperature Tw(O) is equal to or greater than the reference temperature Tw(ref), that is, once the engine 30 has warmed up, the program advances to a step 202. If the coolant temperature Tw(O) is lower than the reference temperature Tw(ref), that is, when the engine 30 is cold, the program advances to a step 205.

In the step 202, the current intake manifold vacuum is derived from the signal Pm. In the program, the variable Pm(O) represents the current intake manifold vacuum. Then, the intake manifold vacuum Pm(O) is compared to a first preset reference vacuum Pm(refl). If the intake manifold vacuum Pm(O) is stronger than the reference vacuum Pm(refl), that is, if the intake manifold pressure Pm(O) is lower than the reference pressure Pm(refl), the program advances to a step 203. If the intake manifold vacuum Pm(O) is equal to or weaker than the reference vacuum Pm(refl), that is, if the intake manifold pressure Pm(O) is equal to or greater than the reference pressure Pm(refl), the program advances to a step 216. The latter case corresponds to a range I (see FIG. 11) of engine operating conditions in which engine load is great and the throttle valve 34 is fully open or near the fully open position. In this range I, a fuel injection rate control segment (not shown) of the program for operating the control unit 60 adjusts the fuel injection signal Si so that a rich air-fuel mixture will be supplied to the engine 30 in order to achieve adequate engine power output.

In the case of engines equipped with turbosuperchargers, the first reference vacuum Pm(refl) may vary as a function of the degree of boost in the intake air pressure.

In the step 203, the intake manifold vacuum Pm(O) is compared to a second preset reference vacuum Pm(ref2). If the intake manifold vacuum Pm(O) is stronger than the reference vacuum Pm(ref2), that is, if the intake manifold pressure Pm(O) is lower than the reference pressure Pm(ref2), the program advances to a step 204. If the intake manifold vacuum Pm(O) is equal to or weaker than the reference vacuum Pm(ref2), that is, if the intake manifold pressure Pm(O) is equal to or higher than the reference pressure Pm(ref2), the program advances to a step 208.

In the step 204, the current engine speed is derived from the crank angle signal Ca. In the program, the variable N(O) represents the current engine speed. Then, the current engine speed N(O) is compared to a preset reference speed N(ref). If the engine speed N(O) is equal to or greater than the reference speed N(ref), the program advances to the step 208. If the engine speed N(O) is lower than the reference speed N(ref), the program advances to a step 217. The latter case corresponds to a range III (see FIG. 11) of engine operating conditions in which the engine speed and the engine load are both low. This range III includes engine idling operation. In this range III, the fuel injection rate control segment (not shown) of the program adjusts the fuel injection signal Si so that a stoichiometric air-fuel mixture will be supplied to the engine 30.

The engine operating range III may be detected by comparing the intake manifold pressure PM(O) to a reference pressure PM(ref2) which decreases as the engine speed N(O) increases. In this case, the step 204 can be omitted.

Figure 11:
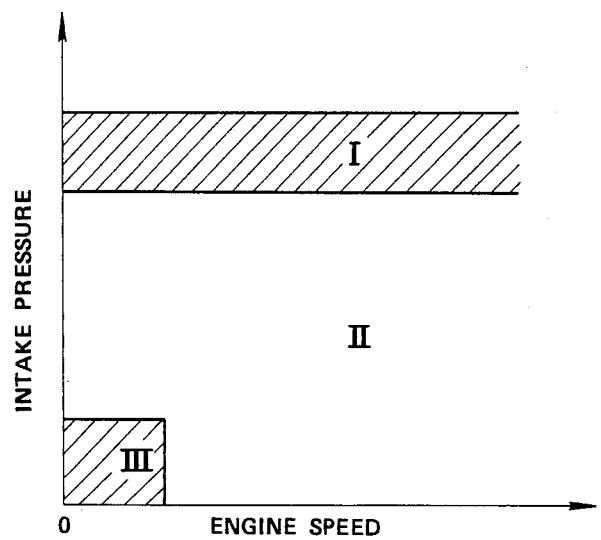
FIG. 11 is a diagram of three ranges of engine operating conditions which are divided in accordance with intake manifold pressure and engine speed.

The cases where the program advances to the step 208 from the step 203 or 204 correspond to a range II of engine operating conditions which resides between the previous ranges I and III as shown in FIG. 11. This engine operating range II includes engine cruising operation. In the range II, during at least part of engine acceleration, the fuel injection rate control segment (not shown) of the program adjusts the fuel injection signal Si so that a stoichiometric air-fuel mixture will be supplied to the engine 30 in order to achieve adequate engine power output. In the rest of this range II, e.g., in the engine cruising operation, a lean air-fuel mixture is supplied to the engine 30 to effectively reduce Nox emissions from the engine 30.

In the step 208 relating to the engine operating range II, a target duration $\theta$tar of combustion of the air-fuel mixture in the engine cylinder 31 which is given in units of crank angle is set to a preset fixed value $\theta 1$. In other words, "$\theta tar=\theta 1$" is executed. The fixed value $\theta 1$ is chosen so as to ensure reliable combustion of the air-fuel mixture and low combustion noise. After the step 208, the program advances to a step 209.

In the step 205, the actual air-to-fuel ratio of the mixture represented by the variable A/F is calculated on the basis of the fuel injection rate determined in the fuel injection rate control segment (not shown) of the program. The actual air-to-fuel ratio may alternatively be measured by means of an oxygen sensor disposed in the exhaust passage 38.

In a step 206 following the step 205, a correction factor K is calculated from the air-fuel ratio A/F by referring to the following equation:

$$K=f(A/F)$$

where f(A/F) is a preset function of the air-to-fuel ratio A/F.

In a step 207 following the step 206, the current intake manifold vacuum Pm(O) and the current engine speed N(O) are derived from the signals Pm and Ca. Then, a basic combustion duration $\theta 2$ is derived from the intake manifold vacuum Pm(O) and the engine speed N(O) by referring to a table stored in the ROM 62. This table holds a set of basic combustion durations which are plotted as a function of intake manifold vacuum and engine speed. Finally, a target combustion duration $\theta tar$ is calculated from the correction factor K and the basic combustion duration $\theta 2$ by referring to the following equation:

$$\theta tar=K\theta 2$$

After the step 207, the program advances to the step 209.

In the step 209, the actual combustion duration $\theta act$ is calculated from the following equation:

$$\theta act=\theta p-\theta i$$

where the variable $\theta p$ represents a crank angle at which the pressure in the combustion chamber 31 peaks, and the variable $\theta i$ represents the spark timing in units of crank angle. In the program, the variable Pa(O) represents the pressure in the combustion chamber 31, that is, the cylinder pressure. The peak pressure crank angle $\theta p$ is measured by another segment of the program which will be described in detail hereinafter. The spark timing $\theta i$ is derived in a spark timing control segment (not shown) of the program for operating the control unit 60. The spark timing $\theta i$ may alternatively be derived from a spark control signal applied to a spark adjustment circuit (not shown).

Figure 12:
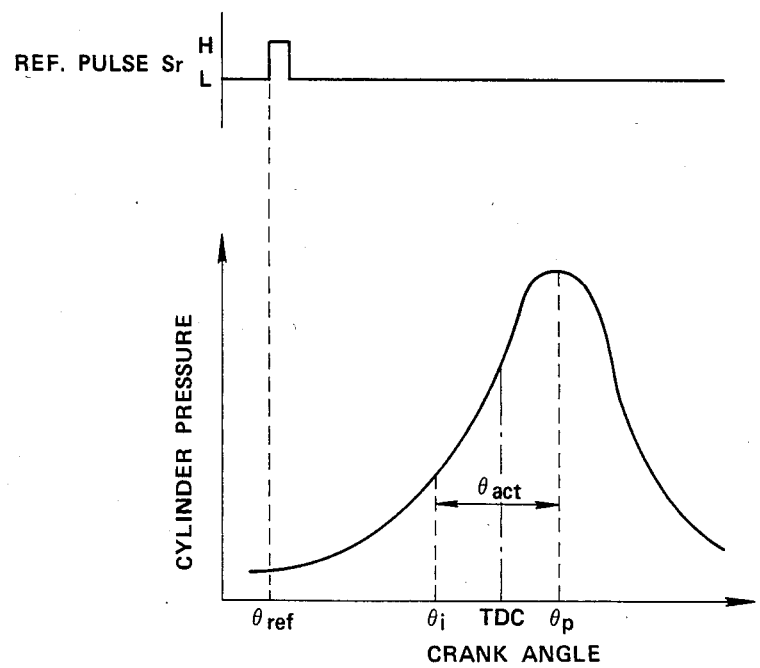
FIG. 12 is a diagram of a reference crank angle pulse and a graph of the pressure in the combustion chamber of FIG. 9 as a function of crank angle.

As shown in FIG. 12, the cylinder pressure Pa(O) varies with the crank angle. The crank angle signal Ca includes reference pulses Sr occurring at a fixed crank angle $\theta ref$ with respect to the cylinder 31 currently subject to pressure measurement. The spark timing $\theta i$ and the peak pressure timing $\theta p$ are represented by crank angle intervals from the reference pulse timing $\theta ref$.

In a step 210 following the step 209, the actual combustion duration $\theta act$ is compared to the target combustion duration $\theta tar$. If the actual combustion duration $\theta act$ is equal to or less than the target combustion duration $\theta tar$, the program advances to a step 211. If the actual combustion duration $\theta act$ is longer than the target combustion duration $\theta tar$, the program advances to a step 214.

In the step 211, the actual combustion duration $\theta act$ is compared to the target combustion duration $\theta tar$ minus a preset small crank angle interval $\theta small$. If the actual combustion duration $\theta act$ is equal to or longer than the target combustion duration $\theta tar$ minus the small interval $\theta small$, the program advances to a step 212. If the actual combustion duration $\theta act$ is shorter than the target combustion duration $\theta tar$ minus the small interval $\theta small$, the program advances to a step 213.

As described previously, if $\theta tar-\theta small \leq \theta act \leq \theta tar$, that is, if the actual combustion duration $\theta act$ is nearly equal to and no greater than the target combustion duration $\theta act$, the program advances to the step 212 in which the variable D representing the duty cycle of the valve control signal Sc is set to the duty cycle value Dold determined in the preceding execution cycle of the program. As a result, the position of the swirl control valves 45 remains as it was and therefore the intake air flow is swirled to the same extent. Since the combustion duration depends on the degree of swirl as understood from FIG. 4, keeping the degree of swirl at the same level ensures that the actual combustion duration remains exactly or essentially equal to the target combustion duration. After the step 212, the program advances to a final step 215.

If $\theta act<\theta tar-\theta small$, that is, if the actual combustion duration $\theta act$ is appreciably shorter than the target combustion duration $\theta tar$, the program advances to the step 213 in which the duty cycle D of the valve control signal Sc is set to the preceding duty cycle value Dold plus a preset constant D1. As a result, the swirl control valves 45 move to reduce the degree of swirl in the intake air flow. Since the combustion duration is inversely related to the degree of swirl as understood from FIG. 4, the reduction of swirl increases the actual combustion duration toward the target combustion duration. After the step 213, the program advances to the final step 215.

If $\theta act>\theta tar$, that is, if the actual combustion duration $\theta act$ is longer than the target combustion duration $\theta tar$, the program advances to the step 214 in which the duty cycle D of the valve control signal Sc is set to the preceding duty cycle value Dold minus a preset constant D2. As a result, the swirl control valves 45 move to enhance the degree of swirl in the intake air flow. Since the combustion duration inversely depends on the degree of swirl as understood from FIG. 4, the enhancement of swirl decreases the actual combustion duration toward the target combustion duration. After the step 214, the program advances to the final step 215.

In this way, the steps 210–214 cooperate to hold the actual combustion duration at essentially the target combustion duration by means of a feed-back control.

When the engine 30 is exposed to the operating range I, the program advances from the step 202 to the step 216 as described previously. In the step 216, the duty cycle D of the valve control signal Sc is set to 100 (%). This fully unblocks the swirl control valves 45, enabling a high rate of intake air flow substantially without swirl and thereby allowing the engine to adequately meet requirements for high power output. After the step 116, the program advances to the final step 215.

When the engine 30 is exposed to the operating range III, the program advances from the step 204 to the step 217 as described previously. In the step 217, the duty cycle D of the valve control signal Sc is set to 0 (%). This fully blocks the swirl control valves 45, most effectively swirling the intake air flow and thereby achieving reliable combustion of the air-fuel mixture. The engine operating range III includes engine idling operation so that the maximal degree of swirl is developed in the air intake flow when the engine is idling. After the step 217, the program advances to the final step 215.

The step 201 may additionally include the function of determining whether or not the coolant temperature Tw(O) is lower than an extremely low reference temperature, e.g., 10° C. If the coolant temperature Tw(O) is lower than this reference temperature, the program preferably advances from the step 201 directly to the step 217.

When the engine 30 is exposed to the operating range II or when the engine 30 is cold, the program advances to one of the duty cycle adjustment steps 212–214 via the steps 210–211 in accordance with the difference between the actual combustion duration and the target combustion duration. As a result of cooperation of these steps 210–214, the actual combustion duration is held at essentially the target combustion duration.

When the engine 30 is cruising within the operating range II so that a lean air-fuel mixture is supplied to the engine 30, the step 208 sets the target combustion duration to the fixed value $\theta 1$. This fixed value $\theta 1$ is chosen to correspond to combustion conditions under which reliable combustion of the air-fuel mixture, a low rate of NOx emission, and low combustion noise are realized. Since the actual combustion duration is held at essentially the target combustion duration by adjusting the degree of swirl in the air-fuel mixture flow, reliable combustion of the air-fuel mixture, a low rate of NOx emission, and low combustion noise are realized when the engine 30 is cruising. In the case where the air-to-fuel ratio of the mixture is 22.0, the combustion duration is represented by the crank angle interval between the points A1 and A2 of FIG. 4.

When the engine 30 accelerates, the air-fuel mixture is enriched to the stoichiometric state so that the combustion duration is shortened out of the target range. Upon the deviation of the combustion duration from the target range, the duty cycle D of the valve control signal Sc is adjusted so as to reduce the degree of swirl in the mixture flow. Since the reduction of the degree of swirl increases the combustion duration, the combustion duration quickly returns to the target range. The return of the combustion duration to the target range involves the prevention of an excessively high combustion speed so that the rate of NOx emission and the level of combustion noise are both kept low. Thus, the combustion duration remains within the target range. In this way, the feed-back control of the combustion duration by means of adjustment of the degree of swirl in the mixture flow automatically compensates for the variation in the combustion duration due to the change of the air-fuel ratio of the mixture. When the engine 30 is accelerating, the combustion duration is approximately represented by the crank angle interval between the points C1 and C2 of FIG. 4.

Figure 13:
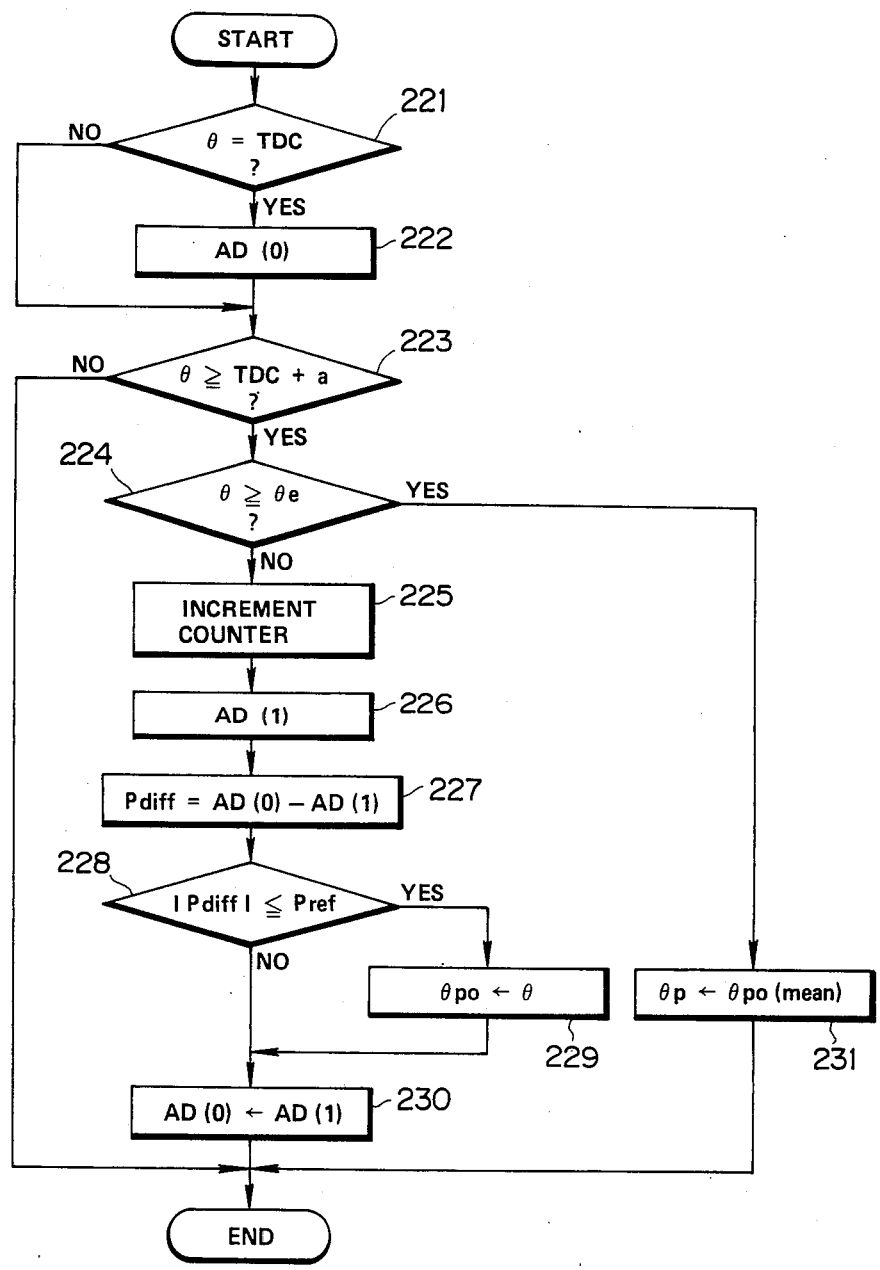
FIG. 13 is a flowchart of a peak pressure crank angle measurement segment of the program for operating the control unit of FIG. 9.

The program for operating the control unit 60 includes a segment which measures the peak pressure crank angle $\theta p$. This segment of the program is triggered by 2° crank angle pulses included in the crank angle signal Ca so that it is executed each time the engine crankshaft rotates through 2°. FIG. 13 is a flowchart of this segment of the program.

As shown in FIG. 13, in a first step 221, the current crank angle $\theta$ is derived from the crank angle signal Ca. Then, the control unit 60 determines whether or not the derived crank angle $\theta$ corresponds to the top dead center (TDC) of the compression stroke. If the crank angle $\theta$ corresponds to the TDC, the program advances to a step 222. When the crank angle $\theta$ does not correspond to the TDC, the program advances to a step 223.

In the step 222, the cylinder pressure signal Pa is transformed into a corresponding digital signal by an analog-to-digital converter included in the I/O circuit 61. Then, the current pressure in the combustion chamber 31 represented by the variable AD(O) is derived from the digital cylinder pressure signal. In this way, the step 222 initializes the variable AD(O) to the cylinder pressure value which occurs at essentially the TDC. As will be made clear hereinafter, the variable AD(O) normally represents the cylinder pressure which has occurred at the execution cycle of the program immediately preceding the present execution cycle of the program. After the step 222, the program advances to the step 223.

In the step 223, the crank angle $\theta$ is compared to a preset crank angle equal to the TDC plus a°, where a is a preset constant in the range of 2° to 4°. If the crank angle $\theta$ is equal to or greater than the preset crank angle, that is, if the engine crankshaft reaches an angular position a° or more distant from the TDC, the program advances to a step 224. If the crank angle $\theta$ is less than the present crank, the program ends.

Figure 14:
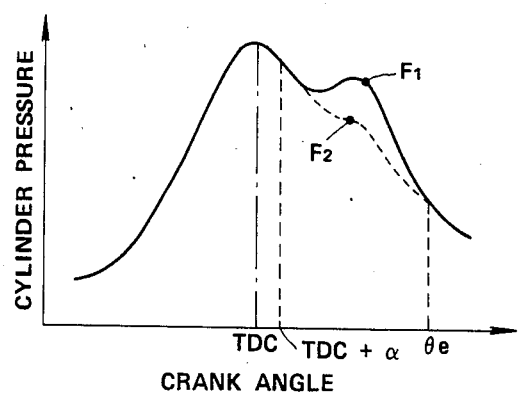
FIGS. 14 to 17 are graphs of the relationships between pressure in the combustion chamber and crank angle.

As shown in FIG. 14, the cylinder pressure generally peaks at the TDC. This peak results from movement of the engine piston. Also, the cylinder pressure peaks after the TDC. This peak results from combustion of the air-fuel mixture. Accordingly, it is necessary to detect the latter peak. The present crank angle TDC+a is chosen to reside between the TDC and a point smaller than a crank angle range within which peaks resulting from the mixture combustion occur. This setting of the present crank angle TDC+a allows the step 223 to prevent detection of a prior peak pressure which does not reflect combustion of the present mixture, since the program ends if the crank angle $\theta$ is less than the preset crank angle.

In the step 224, the crank angle $\theta$ is compared to a second preset crank angle $\theta e$ by which fuel combustion will certainly have been completed. As shown in FIG. 14, the second preset crank angle $\theta e$ follows the TDC by a fixed interval. If the crank angle $\theta$ is less than the preset crank angle $\theta e$, that is, if the mixture combustion has not yet been completed, the program advances to a step 225. If the crank angle $\theta$ is equal to or greater than the preset crank angle $\theta e$, that is, if combustion is already complete, the program advances to a step 231.

In the step 225, a counter in the control unit 60 which represents the crank angle $\theta$ is incremented. Specifically, the variable $\theta$ is incremented by a unit value corresponding to 2° of crank angle.

In a step 226 following the step 224, the cylinder pressure signal Pa is transformed into a corresponding digital signal by the A/D converter. Then, the current cylinder pressure represented by the variable AD(1) is derived from the digital cylinder pressure signal.

In a step 227 following the step 226, the difference between the cylinder pressure values AD(0) and AD(1) is calculated. This difference is represented by the variable Pdiff. In other words, this step 227 executes "Pdiff=AD(0)−AD(1)". It should be noted that the variable AD(0) normally represents the cylinder pressure which has occurred at the execution cycle of the program preceding the present execution cycle of the program. When the cylinder pressure is increasing, the difference Pdiff is positive. When the cylinder pressure is decreasing, the difference Pdiff is negative. When the cylinder pressure is essentially constant, e.g., when the cylinder pressure is near its peak, the absolute value of the difference Pdiff is extremely small.

In a step 228 following the step 227, the absolute value of the difference Pdiff is derived. This absolute value is represented by the variable |Pdiff|. Then, the absolute value |Pdiff| is compared to a preset small value Pref used to detect when the cylinder pressure is essentially constant. If the absolute value |Pdiff| is equal to or less than the preset value Pref, that is, if the cylinder pressure is essentially constant, the program advances to a step 229. If the absolute value |Pdiff| is greater than the preset value Pref, that is, if the cylinder pressure is varying appreciably, the program advances to a step 230.

In the step 229, the variable $\theta$po representing the peak pressure crank angle is set to the crank angle value $\theta$, that is, the value represented by the counter. After the step 229, the program advances to the step 230.

In the case of cylinder pressure variations of FIG. 14, the peak pressure crank angles $\theta$po given in the step 229 correspond to the points F1 and F2 on the solid and dash curves which reside between the first preset crank angle TDC+a and the second preset crank angle $\theta$e.

In the step 230, the variable AD(0) is set to the value AD(1). After the step 230, the program ends. As a result of the step 230, the variable AD(0) represents the cylinder pressure which has occurred at the execution cycle of the program preceding the present execution cycle of the program.

In the step 231, the control unit 60 calculates a mean value of the peak pressure crank angles $\theta$po which have been detected in the present engine operation cycle and a preset number of the consecutive prior engine operation cycles. The variable $\theta$po(mean) represents this mean value. Then, the variable $\theta$p representing the final peak pressure crank angle is set to the mean value $\theta$po(mean). After the step 231, the program ends. It should be noted that when the program advances to the step 231, combustion has already been completed and thus the peak pressure crank angle in the present engine operation cycle has also been detected.

Figure 15:
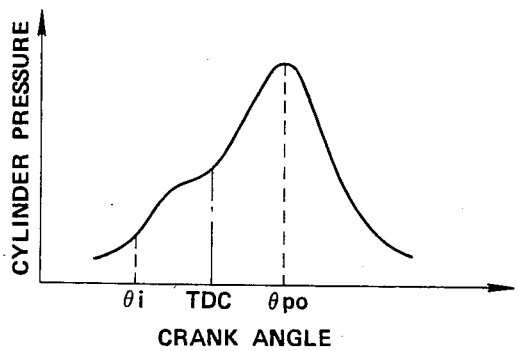

FIG. 15 shows typical variation of the cylinder pressure with crank angle. In this typical case, the cylinder pressure varies through a single peak at a crank angle after the TDC. The crank angle at which the cylinder pressure peaks is detected and is represented by the character $\theta$po.

Figure 16:
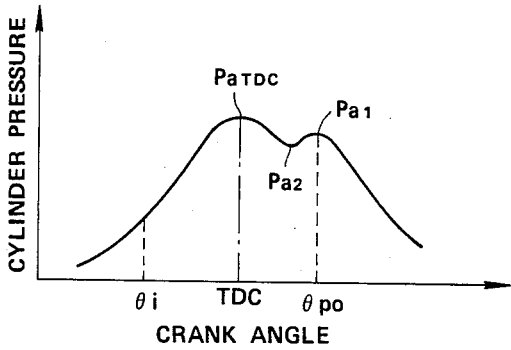

FIG. 16 shows variation of the cylinder pressure with crank angle occurring at small engine loads. In this case, the cylinder pressure varies through two peaks PaTDC and Pa1 and a minimum Pa2 between the peaks. At crank angles corresponding to these points PaTDC, Pa1, and Pa2, the absolute pressure difference |Pdiff| is smaller than the reference value Pref. The former peak PaTDC occurs at the TDC, so that the crank angle corresponding to the peak PaTDC is not detected as the peak pressure crank angle $\theta$po. The minimum Pa2 occurs prior to the latter peak Pa1, so that the crank angle corresponding to the minimum Pa2 is not detected but the crank angle corresponding to the peak Pa1 is detected as the peak pressure crank angle $\theta$po.

Figure 17:
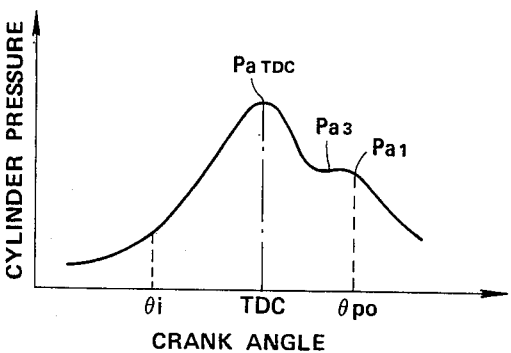

FIG. 17 shows variation of the cylinder pressure with crank angle which occurs when the engine load is considerably small and the combustion pressure is extremely low. In this case, the cylinder pressure varies through a peak PaTDC at the TDC. There is no clear peak or minimum in a range after the TDC, so that it is sometimes difficult to accurately determine the peak pressure crank angle $\theta$po. Differentiation of the cylinder pressure may be used to determine the peak pressure crank angle $\theta$po. It should be noted that the points Pa3 and Pa1 following the TDC correspond to the minimum Pa2 and the peak Pa1 of FIG. 16. The engine operating range III of FIG. 11 is chosen through experiments to include the engine operating conditions under which the engine load is relatively small as in the case of FIG. 17. Accordingly, in the case of FIG. 17, the swirl control valves 45 are forcedly moved to their fully closed positions and thus it is unnecessary to determine the peak pressure crank angle $\theta$po.

The cylinder pressure sensor 103 may alternatively be of the type detecting or analyzing light transmitted from the combustion chamber 31 via a transparent window and an optical fiber.

The engine operating conditions may be detected on the basis of the combination of the rate of intake air flow and the engine speed in place of the combination of the intake manifold pressure and the engine speed. Furthermore, the measured air-to-fuel ratio, such as indication of the output from an oxygen sensor, and the rate of exhaust gas recirculation may be considered in detecting the engine operating conditions.

What is claimed is:

1. A combustion control system for an engine, comprising:
   (a) means for swirling air flow into the engine to an adjustable degree, wherein the degree of swirl in the air flow affects the duration of combustion of a mixture of air and fuel in the engine; and
   (b) means for adjusting the degree of swirl so as to hold the duration of mixture combustion to within an acceptable range.

2. The system of claim 1, further comprising means for adjusting the air-to-fuel ratio of the mixture, and wherein the swirl adjusting means is operative to adjust the degree of swirl in accordance with the adjustment of the air-to-fuel ratio of the mixture.

3. The system of claim 1, further comprising means for detecting the actual duration of combustion of the mixture, means for deriving the difference between the actual duration and the acceptable range of duration of mixture combustion, and wherein the swirl adjusting means is operative to adjust the degree of swirl in accordance with said difference.

4. A combustion control system for an engine, comprising:
   (a) means for swirling air flow into the engine to an adjustable degree;
   (b) means for adjusting the air-to-fuel ratio of a mixture of air and fuel supplied to the engine; and
   (c) means for adjusting the degree of swirl in accordance with the adjustment of the air-to-fuel ratio of the mixture.

5. The system of claim 4, further comprising means for detecting whether or not the engine is accelerating, and wherein the air-to-fuel ratio adjusting means is operative to adjust the air-to-fuel ratio of the mixture in accordance with whether or not the engine is accelerating.

6. The system of claim 5, wherein the air-to-fuel ratio adjusting means is operative to enrich the mixture when the engine is accelerating relative to cases where the engine is not accelerating, and the swirl adjusting means is operative to reduce the degree of swirl when the engine is accelerating relative to cases where the engine is not accelerating.

7. The system of claim 6, further comprising a transmission connected to the engine, means for detecting when the transmission is shifted to a higher gear position, a movable throttle valve for adjustably determining the rate of air flow into the engine, and means for detecting when the throttle valve for adjustably determining the rate of air flow into the engine, and means for detecting when the throttle valve is moved to accelerate the engine, and wherein the air-to-fuel ratio adjusting means enriches the mixture in response to the detection of the shift of the transmission to the higher gear position, and the swirl adjusting means reduces the degree of swirl in response to the detection of the accelerating movement of the throttle valve.

8. A combustion control system for an engine, comprising:
 (a) means for detecting the actual duration of combustion of a mixture of air and fuel in the engine;
 (b) means for monitoring an operating condition of the engine;
 (c) means for deriving a target duration of mixture combustion which varies as a function of the monitored engine operating condition;
 (d) means for deriving the difference between the actual duration and the target duration of mixture combustion;
 (e) means for swirling air flow into the engine to an adjustable degree, wherein the degree of swril on the air flow affects the actual duration of mixture combustion; and
 (f) means for adjusting the degree of swirl in accordance with the difference between said durations so as to adjust the actual duration toward agreement with the target duration.

* * * * *